US011188726B1

(12) United States Patent
Gururaja et al.

(10) Patent No.: US 11,188,726 B1
(45) Date of Patent: Nov. 30, 2021

(54) METHOD OF DETECTING A SCAN AVOIDANCE EVENT WHEN AN ITEM IS PASSED THROUGH THE FIELD OF VIEW OF THE SCANNER

(71) Applicant: ZEBRA TECHNOLOGIES CORPORATION, Lincolnshire, IL (US)

(72) Inventors: Abhilash Gururaja, Levittown, NY (US); Christopher J. Fjellstad, Smithtown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/887,192

(22) Filed: May 29, 2020

(51) Int. Cl.
*G06K 7/14* (2006.01)
*G07G 1/00* (2006.01)
*G01G 19/414* (2006.01)
*A47F 9/04* (2006.01)

(52) U.S. Cl.
CPC ............ *G06K 7/1439* (2013.01); *A47F 9/046* (2013.01); *G01G 19/4144* (2013.01); *G07G 1/0054* (2013.01)

(58) Field of Classification Search
CPC .. G06K 7/1439; A47F 9/046; G01G 19/4144; G07G 1/0054
USPC .................................................. 235/462.13
See application file for complete search history.

(56) References Cited

U.S. PATENT DOCUMENTS

| 6,215,078 | B1* | 4/2001 | Torres ................ G01G 19/4144 177/25.15 |
| 7,454,365 | B1* | 11/2008 | Brosnan ................. G01G 19/14 340/568.1 |
| 7,516,888 | B1* | 4/2009 | Kundu .................... G06Q 20/00 235/375 |
| 8,132,725 | B2* | 3/2012 | Kundu ............... G06K 9/00718 235/383 |
| 8,681,232 | B2* | 3/2014 | Fan ........................ H04N 5/232 348/211.4 |
| 10,592,944 | B2* | 3/2020 | Kundu ................. G06Q 20/202 |
| 10,745,039 | B1* | 8/2020 | Gao ........................ G01G 19/12 |
| 10,755,259 | B2* | 8/2020 | Lipton ................. G07G 1/0036 |
| 2003/0040925 | A1* | 2/2003 | Gutta ............... G08B 13/19671 348/143 |
| 2005/0189412 | A1* | 9/2005 | Hudnut ................ G07G 1/0081 235/383 |

(Continued)

Primary Examiner — Daniel Hess
(74) Attorney, Agent, or Firm — Yuri Astvatsaturov

(57) ABSTRACT

Methods of detecting scan avoidance events are disclosed herein. An example method includes measuring, by a weighing scale associated with a barcode reader, an unstable weight over a timeframe having a duration that is greater than a threshold duration. The method further includes monitoring for (i) the barcode reader's failure, during the first timeframe, to transition from a first state in which an imager of the barcode reader does not transmit images for decoding to a second state in which the imager captures images over an FOV including a product scanning region and transmits the captured images for decoding; or (ii) the barcode reader's failure to decode a barcode from images captured over the FOV including the product scanning region during the first timeframe; and generating an alert indicating a potential scan avoidance event responsive to both the measured unstable weight over the timeframe and one of (i) or (ii).

14 Claims, 6 Drawing Sheets

(56) References Cited

U.S. PATENT DOCUMENTS

| | | | |
|---|---|---|---|
| 2006/0243798 A1* | 11/2006 | Kundu | G06Q 20/4016 235/383 |
| 2009/0307097 A1* | 12/2009 | De Faria | G07G 1/0054 705/17 |
| 2010/0059589 A1* | 3/2010 | Goncalves | G06K 5/00 235/383 |
| 2011/0280547 A1* | 11/2011 | Fan | G06K 9/00355 386/239 |
| 2012/0169879 A1* | 7/2012 | Libal | G08B 13/194 348/150 |
| 2012/0320199 A1* | 12/2012 | Kundu | G06Q 20/208 348/143 |
| 2013/0085878 A1* | 4/2013 | Edwards | G07G 1/0054 705/23 |
| 2017/0083887 A1* | 3/2017 | Volta | G06Q 20/208 |
| 2017/0243186 A1* | 8/2017 | Cleper | G01G 19/4144 |
| 2017/0286939 A1* | 10/2017 | Okamura | G07G 3/003 |
| 2018/0165733 A1* | 6/2018 | Kundu | G06Q 30/0609 |
| 2018/0218350 A1* | 8/2018 | Crooks | G07G 1/0072 |
| 2020/0408588 A1* | 12/2020 | Gregory | G01G 3/145 |
| 2021/0117950 A1* | 4/2021 | Bentsur | G06K 7/1417 |

\* cited by examiner

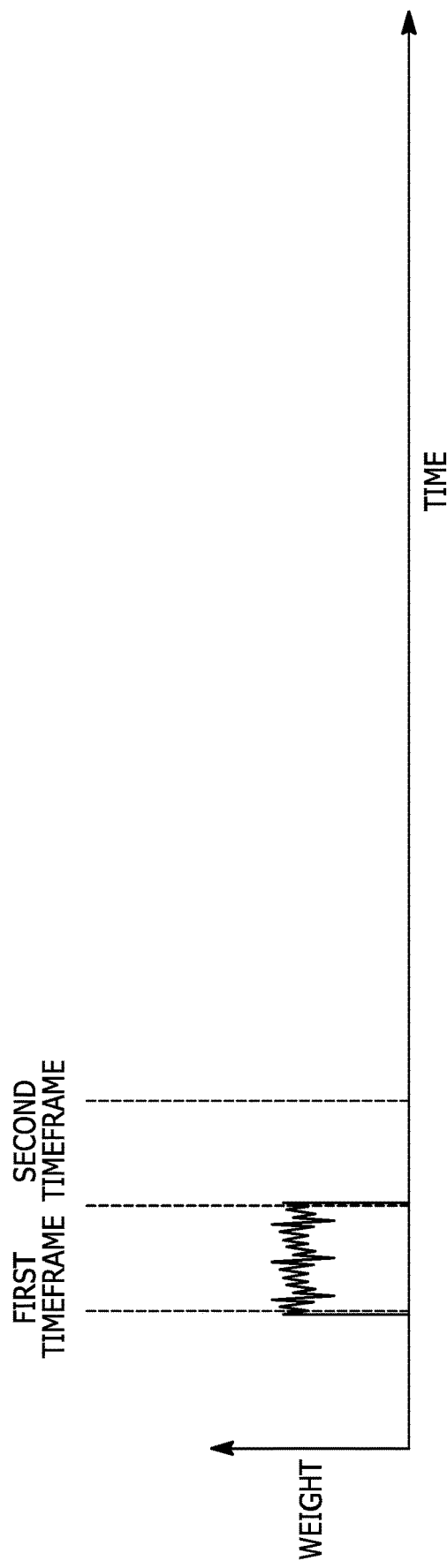

METHOD OF DETECTING A SCAN AVOIDANCE EVENT WHEN AN ITEM IS PASSED THROUGH THE FIELD OF VIEW OF THE SCANNER

BACKGROUND

In a retail environment, purchasing items typically involves capturing images of barcodes attached to each item to be purchased using a barcode reader. The barcode reader then decodes the barcodes to identify each item being purchased. In some cases, retail employees scan barcodes attached to each item a customer wishes to purchase, while in other cases, customers scan the barcodes attached to items they wish to purchase at self-checkout stations. However, in some instances of "scan avoidance," a barcode attached to an item that is moved through the field of view (FOV) of the barcode reader is not actually captured or decoded by the scanner, and the item is bagged and taken without a purchase occurring. For instance, a retail employee or a customer may accidentally (or intentionally) move the item through the FOV of the scanner too quickly for an image of a barcode attached to the item to be captured. As another example, a retail employee or a customer may accidentally (or intentionally) cover, obscure, or remove the barcode attached to the item as the item is moved through the FOV of the scanner, so that no image of the barcode attached to the item is captured. Thus, there is a need for devices, systems, and methods that are directed towards reducing instances of scan avoidance.

SUMMARY

In an embodiment, the present invention is a method of detecting a scan avoidance event, the method comprising: measuring, by a weighing scale associated with a barcode reader, an unstable weight during a first timeframe having a duration that exceeds a duration threshold; monitoring for: (i) a failure of the barcode reader to transition, during at least a portion of the first timeframe, from a first state in which an imager of the barcode reader does not transmit images for decoding and a second state in which the imager captures images over a field of view (FOV) including a product scanning region and transmits the captured images for decoding; or (ii) a failure of the barcode reader to decode a barcode from at least one image captured by the imager of the barcode reader over the FOV including the product scanning region during at least a portion of the first timeframe; and generating an alert indicating a potential scan avoidance event responsive to both the measured unstable weight during the first timeframe and an occurrence of one of: (i) or (ii).

In a variation of this embodiment, generating the alert indicating the potential scan avoidance event further includes capturing an image of an area of the weighing scale.

In another embodiment, the present invention is a system for detecting a scan avoidance event, the system comprising: a weighing scale; a barcode reader associated with the weighing scale, the barcode reader configured to capture images over a field of view (FOV) including a product scanning region and configured to decode barcodes depicted in the captured images; a memory storing computer-readable instructions; and a processor configured to execute the computer-readable instructions stored on the memory to: determine that the weighing scale has measured an unstable weight over a first timeframe having a duration that is greater than a threshold duration; monitor for one of: (i) a failure of the barcode reader to transition, during at least a portion of the first timeframe, from a first state in which an imager of the barcode reader does not transmit images for decoding and a second state in which the imager captures images over a field of view (FOV) including a product scanning region and transmits the captured images for decoding; or (ii) a failure of the barcode reader to decode a barcode from at least one image captured by the imager of the barcode reader over the FOV including the product scanning region during at least a portion of the first timeframe; and generate an alert indicating a potential scan avoidance event responsive to both the measured unstable weight during the first timeframe and an occurrence of one of (i) or (ii).

In a variation of this embodiment, the instructions causing the processor to generate the alert indicating the potential scan avoidance event further include instructions causing the barcode reader to capture an image of an area of the weighing scale.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 6A and 6B illustrate example graphs illustrating weight measured by a weighing scale associated with a barcode reader over time in various example scenarios.

Figure 1:
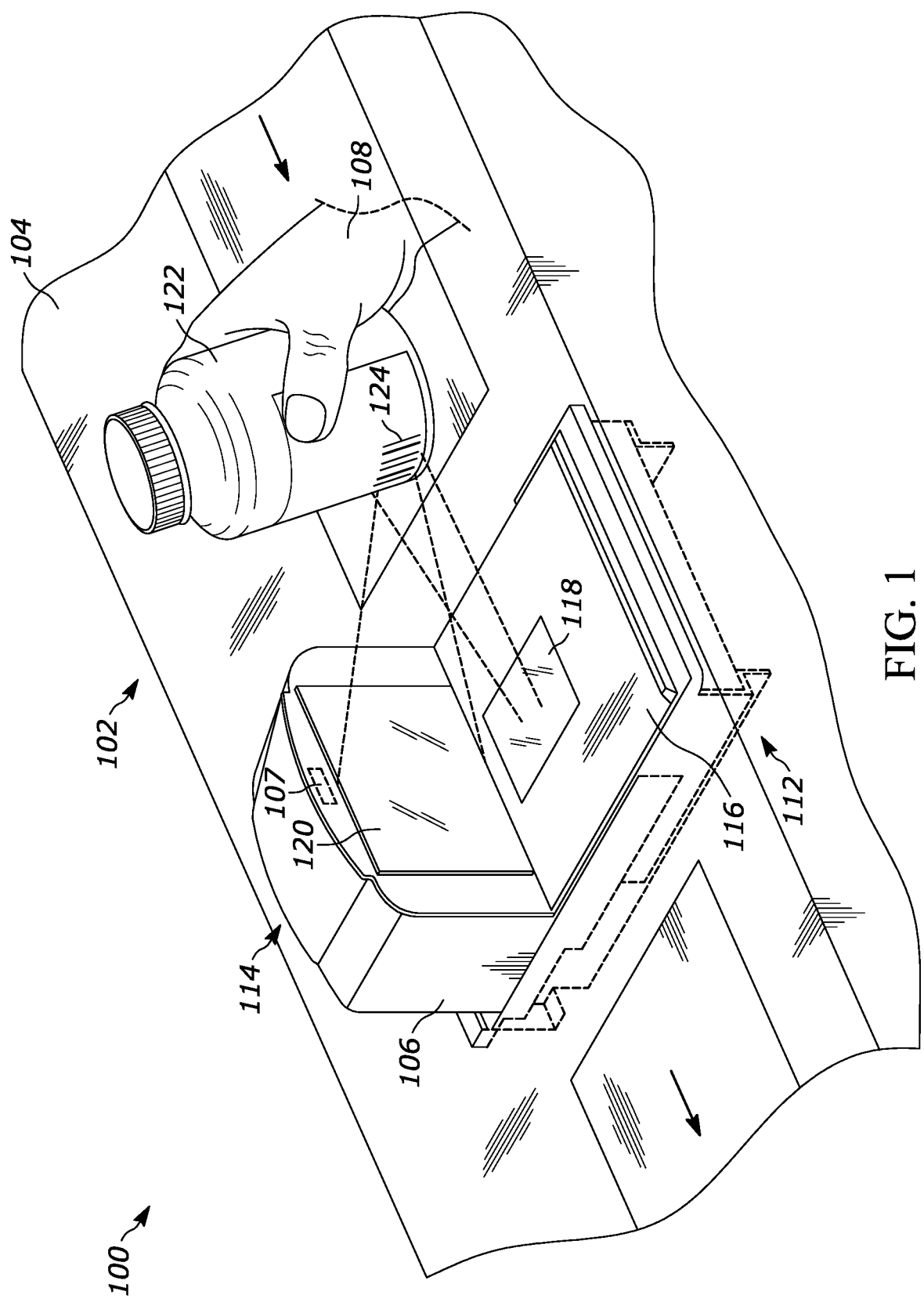
FIG. 1 illustrates a perspective view of a point-of-sale (POS) system having a workstation with a counter, and a bi-optical (also referred to as "bi-optic") barcode reader that may be used in the systems and methods described herein, including systems and methods for detecting a potential scan avoidance event when a weighing scale associated with a barcode reader detects an unstable weight during a given timeframe but the barcode reader fails to "wake up" to decode barcodes during at least a portion of the timeframe or fails to successfully decode any barcodes during at least a portion of the timeframe.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure provides techniques for detecting a scan avoidance event when an electronic scale (also called a "weighing scale") associated with a barcode reader detects an unstable weight during a given timeframe but the barcode reader fails to "wake up" to decode barcodes during at least a portion of the timeframe or fails to successfully decode any barcodes during at least a portion of the timeframe. That is, regardless of whether an image of a barcode attached to the item is actually captured or decoded by the barcode reader, the item will typically be dragged across the weighing scale (or will at least briefly hit the weighing scale) as a user, such as a customer or a retail employee, moves the item through a product scanning region associated with the barcode reader. Such dragging or brief touch of the weighing scale of the barcode reader to register an "unstable weight," i.e., a fluctuating weight as opposed to a "stable weight" registered when an item settles upon the weighing scale. Consequently, when a weighing scale associated with a barcode reader detects an unstable weight during a given timeframe but the barcode reader fails to "wake up" to decode barcodes during at least a portion of the timeframe or fails to successfully decode any barcodes during at least a portion of the timeframe, then it is likely that a scan avoidance event has occurred, and appropriate personnel can be notified and/or an appropriate alert can be generated. Advantageously, the present techniques can allow for the detection of potential scan avoidance events without the use of an expensive neural network, thought it should be understood that augmenting the techniques described herein with additional systems of varying complexity is certainly feasible.

FIG. 1 illustrates a perspective view of a point-of-sale (POS) system 100 having a workstation 102 with a counter 104 and a bi-optical (also referred to as "bi-optic") barcode reader 106 that may be used in the systems and methods described herein, including systems and methods for detecting a potential scan avoidance event when a weighing scale associated with a barcode reader detects an unstable weight during a given timeframe but the barcode reader fails to "wake up" to decode barcodes during at least a portion of the timeframe or fails to successfully decode any barcodes during at least a portion of the timeframe. The POS system 100 is often managed by a store employee such as a clerk 108. However, in other cases the POS system 100 may be a part of a so-called self-checkout lane where instead of a clerk, a customer is responsible for checking out his or her own products.

The barcode reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the barcode reader 106. Generally speaking, the top portion 116 includes a removable or a non-removable weighing platter that is a part of an electronic scale configured to measure/register the weight of objects placed on the top portion 116. The top portion 116 be viewed as being positioned substantially parallel with the counter 104 surface. As set forth herein, the phrase "substantially parallel" means+/−30° of parallel and/or accounts for manufacturing tolerances. It's worth noting that while, in FIG. 1, the counter 104 and the top portion 116 are illustrated as being about co-planar, that does not have to be the case for the platter and the counter 104 to be considered substantially parallel. In some instances, the counter 104 may be raised or lowered relative to the top surface of the top portion 116, where the top portion 116 is still viewed as being positioned substantially parallel with the counter 104 surface. In other implementations, the counter 104 may be absent all together and the barcode reader can be perched on top of a kiosk. The raised housing 114 is configured to extend above the top portion 116 and includes a second optically transmissive window 120 positioned in a generally upright plane relative to the top portion 116 and/or the first optically transmissive window 118. Note that references to "upright" include, but are not limited to, vertical. Thus, as an example, something that is upright may deviate from a vertical axis/plane by as much as 30°.

In practice, a product 122, such as for example a bottle, is swiped past the barcode reader 106 such that a barcode 124 associated with the product 122 is digitally read through at least one of the first and second optically transmissive windows 118, 120. This is particularly done by positioning the product 122 within the fields of view FOV of the digital imaging sensor(s) housed inside the barcode reader 106.

Figure 2:
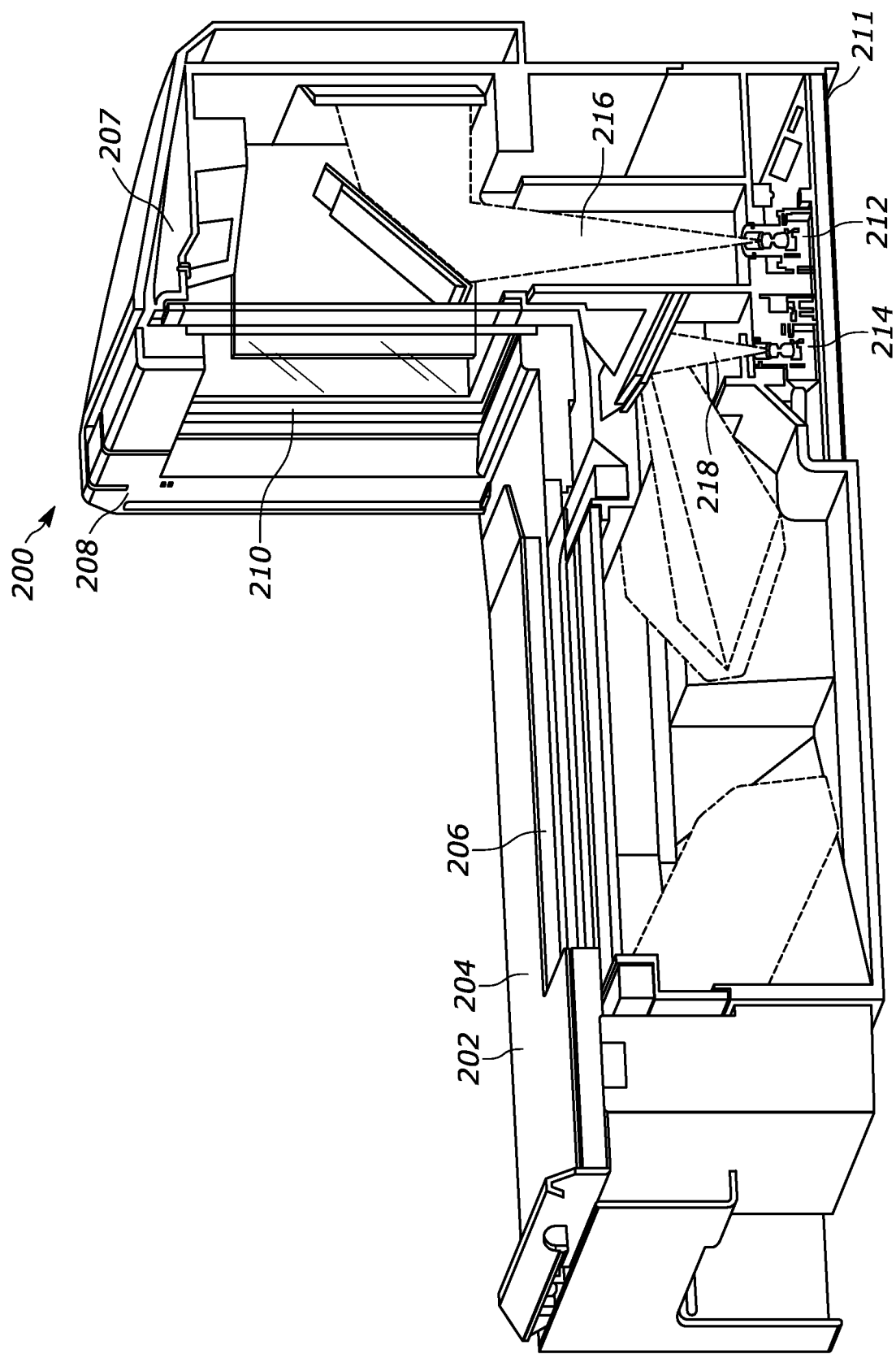
FIG. 2 illustrates a cross-sectional perspective view of an example bi-optic barcode reader that may be used in the systems and methods described herein, including systems and methods for detecting a potential scan avoidance event when a weighing scale associated with a barcode reader detects an unstable weight during a given timeframe but the barcode reader fails to "wake up" to decode barcodes during at least a portion of the timeframe or fails to successfully decode any barcodes during at least a portion of the timeframe.

FIG. 2 illustrates a cross-sectional perspective view of an example bi-optic barcode reader 200 that can be used to implement the barcode reader 106 of FIG. 1, in accordance with embodiments of the present application. As shown, the barcode reader 200 includes an example first housing portion 202 that supports a generally horizontal weighing platter 204 having a first window 206. The first window 206 may be implemented as an optically transmissive window and may be referred to as a generally horizontal window. The barcode reader 200 is also shown including an example second housing portion 208 that supports a second window 210. The second housing portion 208 may be referred to as a tower and the second window 210 may be referred to as a generally vertical window. The second window 210 may be implemented as an optically transmissive window. As shown, the first window 206 is substantially perpendicular relative to the second window 210. As set forth herein, the phrase "substantially perpendicular" means+/−30° of perpendicular and/or accounts for manufacturing tolerances.

To enable imaging data to be obtained by the barcode reader 200, the barcode reader 200 includes a printed circuit board (PCB) 211 with one or more imaging assemblies 212, 214. The imaging assemblies 212, 214 may be referred to as cameras or imager assemblies. Each of the imaging assemblies 212, 214 includes an imaging sensor having a plurality of photosensitive elements that define a substantially flat surface along with other components such as a housing and lens(es) for capturing image data for a FOV. The arrangement and configuration of the components including the imaging sensor, the photosensitive elements, the housing, the lens(es) define a specific FOV for each of the imaging assemblies 212, 214. As shown, the first imaging assembly 212 is configured to capture image data over a first FOV 216 and the second imaging assembly 214 is configured to capture image data over a second FOV 218. The image data captured by the first and second imaging assemblies 212, 214 may include image data representative of an environment in which a barcode or target may appear.

Figure 3:
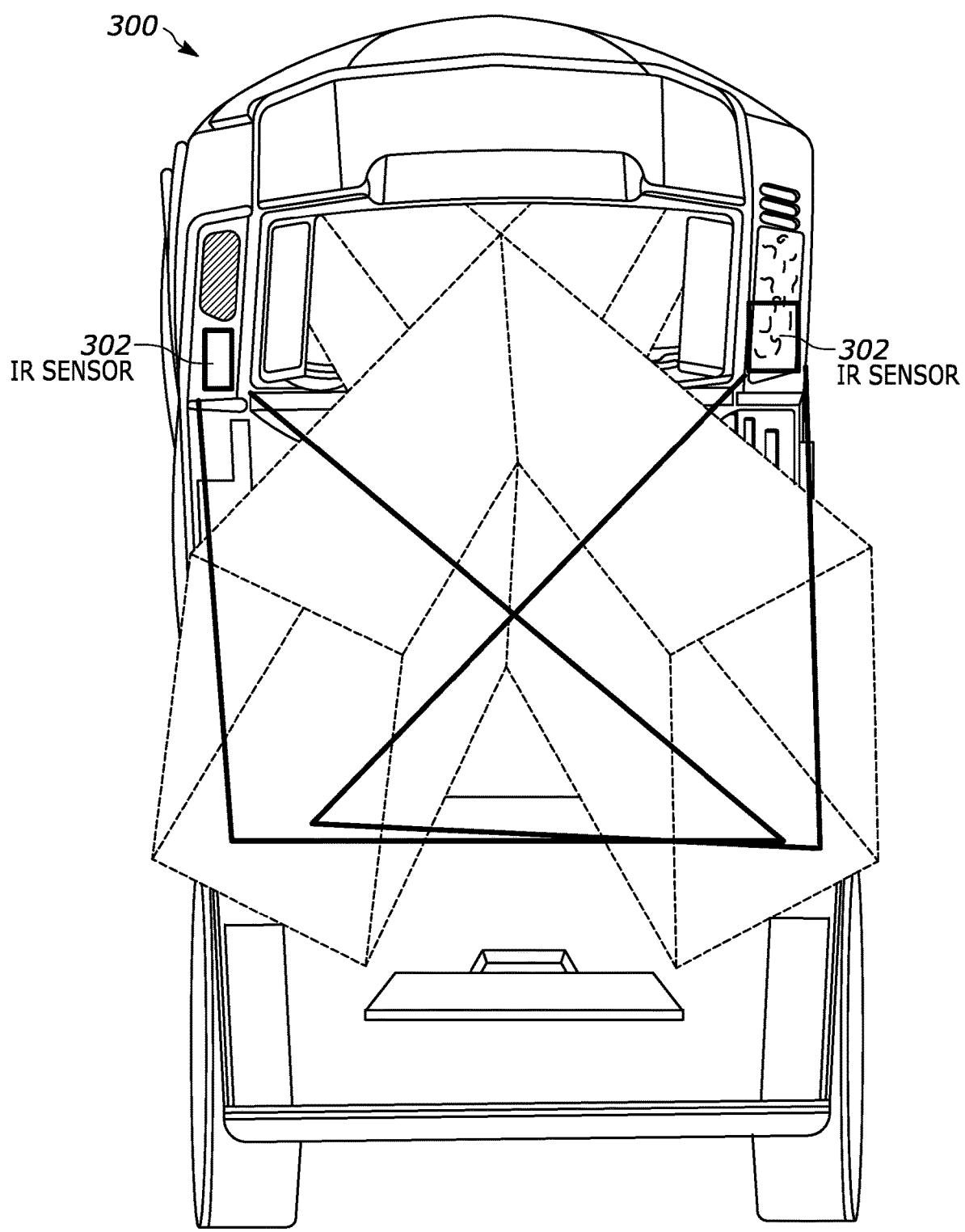
FIG. 3 illustrates an example bi-optic barcode reader that includes infrared (IR) sensors that cause the barcode reader to "wake up," that may be used in the systems and methods described herein, including systems and methods for detecting a potential scan avoidance event when a weighing scale associated with a barcode reader detects an unstable weight during a given timeframe but the barcode reader fails to "wake up" to decode barcodes during at least a portion of the timeframe or fails to successfully decode any barcodes during at least a portion of the timeframe.

FIG. 3 illustrates an example bi-optic barcode reader 300 (e.g., a barcode reader 300 equipped with some or all of the features of the barcode readers 106 and/or 200 discussed above) that further includes infrared (IR) sensors 302 that cause the barcode reader 300 to "wake up," when motion is detected within their range. The bi-optic barcode reader 300 shown in FIG. 3 may be used in the systems and methods described herein, including systems and methods for detecting a potential scan avoidance event when a weighing scale associated with a barcode reader detects an unstable weight during a given timeframe but the barcode reader fails to "wake up" to decode barcodes during at least a portion of the timeframe or fails to successfully decode any barcodes during at least a portion of the timeframe.

For instance, "waking up" a barcode reader 300 may include transitioning the barcode reader 300 from a "sleep" mode in which the barcode reader 300 does not capture images of the product scanning region, or captures images (e.g., at a first rate) of the product scanning region but does not attempt to decode barcodes from the captured images, to a "wake" mode in which the barcode reader captures images (e.g., at a second, faster rate) of the barcode scanning region and attempts to decode barcodes from the captured images. As shown in FIG. 3, the IR sensors 302 may be configured to operate with a limited range such that only motion within a designated product scanning region will trigger a transition from the "sleep" mode to the "wake" mode of the barcode reader 300, but such that motion outside of the product scanning region will not trigger a transition from the "sleep" mode to the "wake" mode of the barcode reader 300. For instance, the IR sensors 302 may be configured to detect motion only within the product scanning region so that an individual who walks by the barcode reader 300 but who does not place any items within the product scanning region will not trigger a transition from the "sleep" mode to the "wake" mode of the barcode reader 300.

Figure 4:
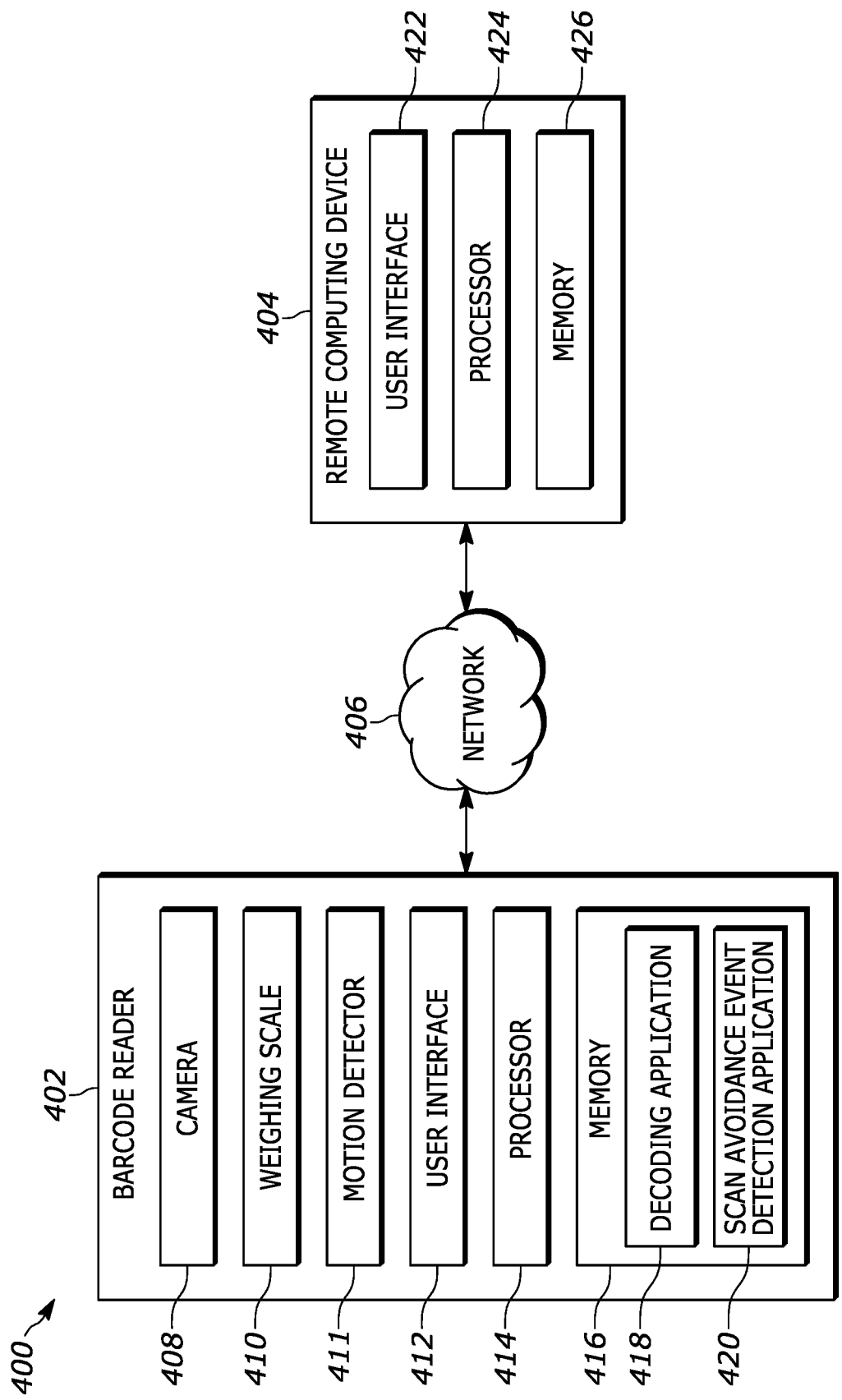
FIG. 4 illustrates a block diagram of an example system including a logic circuit for implementing the example methods and/or operations described herein, including systems and methods for detecting a potential scan avoidance event when a weighing scale associated with a barcode reader detects an unstable weight during a given timeframe but the barcode reader fails to "wake up" to decode barcodes during at least a portion of the timeframe or fails to successfully decode any barcodes during at least a portion of the timeframe.

FIG. 4 illustrates a block diagram of an example system 400 including a logic circuit for implementing the example methods and/or operations described herein, including systems and methods for detecting a potential scan avoidance event when a weighing scale associated with a barcode reader detects an unstable weight during a given timeframe but the barcode reader fails to "wake up" to decode barcodes during at least a portion of the timeframe or fails to successfully decode any barcodes during at least a portion of the timeframe. The system 400 may include a barcode reader 402 and a remote computing device 404 configured to communicate via a network 406 (e.g., a wired or wireless network). While computing device 404 is described as a "remote" computing device, in some examples computing device 404 may be local to the barcode reader 402.

The barcode reader 402, which may be, e.g., a POS system 100 and/or a barcode reader 106 as described with respect to FIG. 1, a barcode reader 200 described with respect to FIG. 2, or a barcode reader 300 described with respect to FIG. 3, may include a camera (or other imager or image sensor) 408, as well as a weighing scale 410, motion detectors 411, a user interface 412, a processor 414, and a memory 416. The camera 408 may be configured to capture images or videos of objects being scanned (e.g., at a checkout station) and barcodes attached to such objects, e.g., through a window of the barcode reader 106. In particular, the camera 408 may have a FOV that includes a product scanning region. In some examples, the barcode reader 402 may include multiple cameras 408, e.g., one camera having a FOV that includes the product scanning region, and another camera having a FOV that is positioned and/or angled to capture images of a user of the barcode reader 402.

The weighing scale 410 may be an electronic scale generally used to measure the weight of objects, such as produce, that are priced based on weight. While the weighing scale 410 is shown as part of the barcode reader 402, in some examples, the weighing scale 410 may be associated with or nearby the barcode reader 402 and configured to communicate with the barcode reader 402 but not actually attached to the barcode reader 402. Generally speaking, the weighing scale 410 may be configured to distinguish between the measurement of a stable weight (e.g., a same weight measurement that is maintained, e.g., for a certain period of time) and an unstable weight (e.g., a weight measurement that fluctuates or rapidly changes, or otherwise a weight measurement that is not maintained, e.g., for a certain period of time), and may record instances in which an unstable weight is measured (or registered, or otherwise detected) for a timeframe that has a duration that is greater than a threshold duration (e.g., greater than 0.5 seconds, greater than 1 second, greater than 2 seconds, etc.)

The motion detectors 411 may include, e.g., infrared sensors 302 as discussed with respect to FIG. 3, or other suitable sensors for detecting motion in a product scanning region associated with a barcode reader 402. In particular, the motion detectors 411 may be configured to determine when there is an item in the product scanning region, and may send a signal to the processor 414 causing the processor to trigger a transition from the "sleep" mode to the "wake" mode of the barcode reader based on a detected item or detected motion in the product scanning region. For instance, the motion detectors 411 may have a limited range, e.g., such that only items or motion within the product scanning region are detected, and items or motion outside of the product scanning region are not detected (or do not cause the motion detectors 411 to send a signal to the processor 414 to trigger a transition from the "sleep" mode to the "wake" mode of the barcode reader).

The user interface 412 may include a display screen, and may be configured to present information and/or images to a user of the barcode reader 402, such as, e.g., pricing information, information confirming a successful scan of each item, information regarding the weight of each item, various alerts (e.g., a scan avoidance event alert), images captured by the camera(s) 408, etc. In some examples, the user interface 412 may be part of the barcode reader 402 or POS device including the barcode reader 402. Moreover, in some examples, the user interface 412 may be a display associated with a separate computing device or monitor (not shown) to which the barcode reader 402 is communicatively connected.

Figure 5:
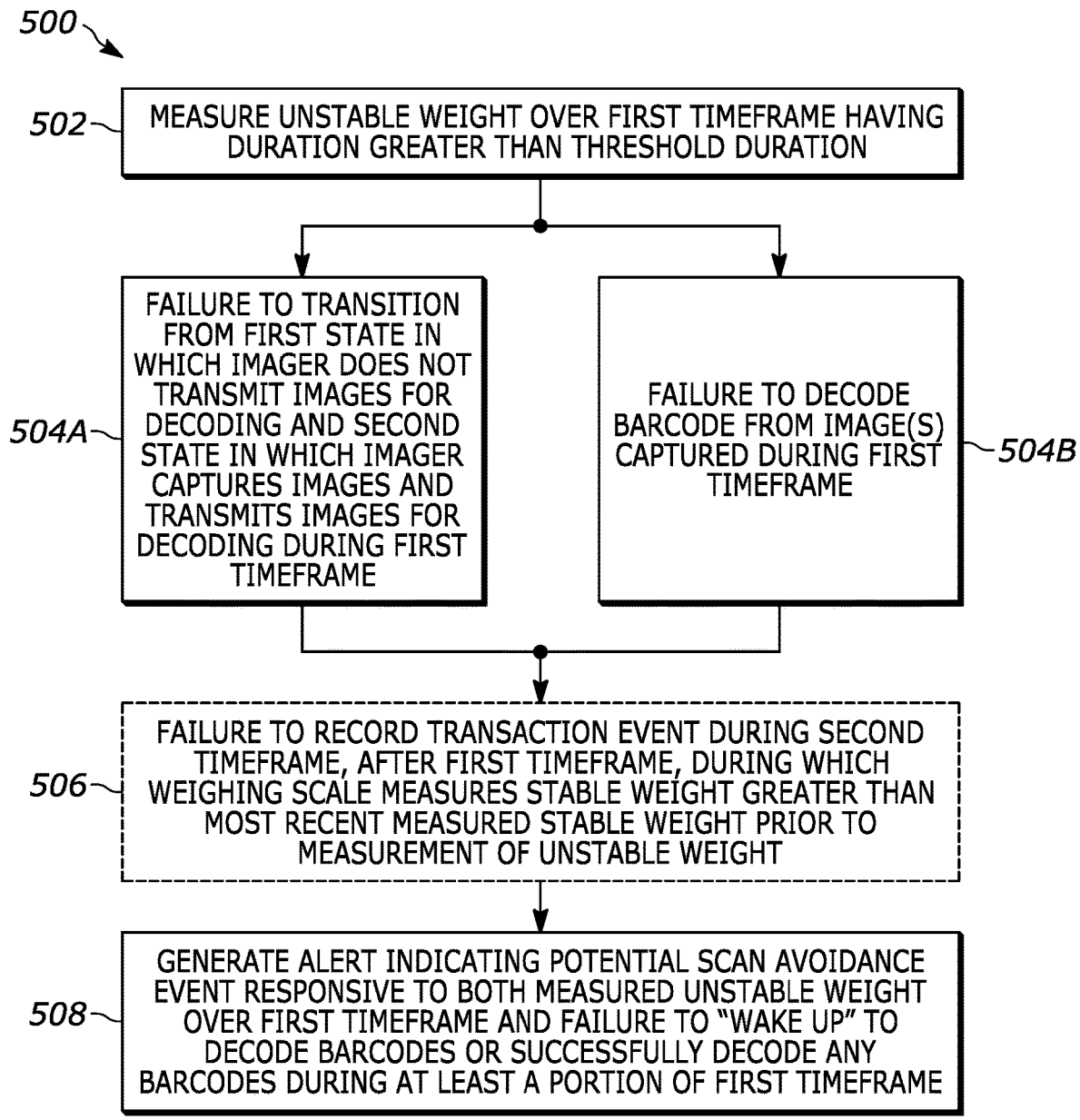
FIG. 5 illustrates a block diagram of an example process as may be implemented by the system of FIG. 5, for implementing example methods and/or operations described herein, including systems and methods for detecting a potential scan avoidance event when a weighing scale associated with a barcode reader detects an unstable weight during a given timeframe but the barcode reader fails to "wake up" to decode barcodes during at least a portion of the timeframe or fails to successfully decode any barcodes during at least a portion of the timeframe.

The processor 414, which may be, for example, one or more microprocessors, controllers, and/or any suitable type of processors, may interact with the memory 416 accessible by the one or more processors 414 (e.g., via a memory controller) to obtain, for example, machine-readable instructions stored in the memory 416 corresponding to, for example, the operations represented by the flowchart of FIG. 5. In particular, the instructions stored in the memory 416 may include instructions for executing a decoding application 418, as well as instructions for executing a scan avoidance event detection application 420. The decoding application 418 may generally be configured to decode barcodes in images or videos captured by the camera 408. In some examples, the decoding application 418 may be configured to transition from a "sleep" mode in which the barcode reader 300 does not capture images of the product scanning region, or captures images (e.g., at a first rate) of the product scanning region but does not attempt to decode barcodes from the captured images, to a "wake" mode in which the barcode reader captures images (e.g., at a second, faster rate) of the barcode scanning region and attempts to decode barcodes from the captured images, e.g., based on receiving signals from the motion detector 411 or other suitable sensors associated with the barcode reader 402.

The scan avoidance detection application 420 may be configured to determine that potential scan avoidance events have occurred based on instances in which the weighing scale 410 measures or otherwise registers or detects an unstable weight during a timeframe having a duration greater than a threshold duration but the barcode reader 402 fails to transition from the "sleep" mode to the "wake" mode during at least a portion of the timeframe, or the decoding application 418 fails to decode a barcode during at least a portion of the timeframe. In particular, upon determining that a potential scan avoidance event has occurred, the scan avoidance event detection application 420 may generate an alert to be displayed via the user interface 412, or may cause such an alert to be sent to the remote computing device 404. Furthermore, in some examples, upon determining that a potential scan avoidance event has occurred, the scan avoidance event detection application 420 may cause the camera(s) 408 to capture a color image (or a black and white image, a greyscale image, etc.) of the product scanning region and/or an image of a user of the barcode scanner 402. For instance, the scan avoidance detection application 420 may capture the color image of the product scanning region immediately upon determining that the potential scan avoidance event has occurred, or within a short duration of time after determining that the potential scan avoidance event has occurred. In some examples, one or more of these captured images may be included in an alert displayed via the user interface 412 or sent to the remote computing device 404.

In some examples, the instructions stored in the memory 416 may further include instructions for generating and logging transaction events based on the weighing scale 410 detecting a stable weight for a threshold period of time, e.g., indicative of a produce item settled on the weighing scale 410. For instance, a transaction event may include charging a customer for a particular type of produce based on the stable weight measured by the weighing scale 410 (e.g., based on customer input regarding the type of produce, or based on object recognition techniques performed upon images of the produce captured by an imager of the barcode reader 402). For example, as a produce item is initially added to the weighing scale 410, the weighing scale may measure an unstable weight as the produce item settles upon the weighing scale 410, but once the produce item is fully settled on the weighing scale 410 may measure a stable weight, and a transaction event may be generated and logged.

Consequently, in some such examples, the barcode reader 402 may fail to "wake" and/or decode barcodes because barcodes generally are not decoded when produce items are being weighed, but there may not be a scan avoidance event because a customer is simply using the weighing scale 410 associated with the barcode reader to weigh produce. Accordingly, in some instances, the scan avoidance detection application 420 may only determine that a scan avoidance event has occurred when the barcode reader 402 fails to transition from the "sleep" mode to the "wake" mode or decode a barcode during at least a portion of the timeframe during which the unstable weight is measured, and further fails to generate and/or log a transaction event in a timeframe subsequent to the timeframe during which the unstable weight is measured.

The remote computing device 404 may include a user interface 422, as well as a processor 424 and a memory 426. The user interface 422 may include a display screen, and may be configured to present information and/or images to another user (e.g., besides the user of the barcode reader) such as, e.g., a retail store manager, a retail store owner, or other retail store stakeholder. For example, the user interface 422 may present scan avoidance event alerts generated by the barcode reader 402 and sent to the remote computing device 404.

The processor 424, which may be, for example, one or more microprocessors, controllers, and/or any suitable type of processors, may interact with the memory 426 accessible by the one or more processors 424 (e.g., via a memory controller) to obtain, for example, machine-readable instructions stored in the memory 426 corresponding to, for example, the operations represented by the flowcharts of this disclosure, including those of FIG. 4. In particular, the instructions stored in the memory 426 may include instructions for displaying scan avoidance event alerts generated by the barcode reader 402 and sent to the remote computing device 404.

FIG. 5 illustrates a block diagram of an example process 500 as may be implemented by the system of FIG. 4, for implementing example methods and/or operations described herein, including systems and methods for detecting a potential scan avoidance event when a weighing scale associated with a barcode reader detects an unstable weight during a given timeframe but the barcode reader fails to "wake up" to decode barcodes during at least a portion of the timeframe or fails to successfully decode any barcodes during at least a portion of the timeframe.

At block 502, a weighing scale associated with a barcode reader may measure, or otherwise detect or register, an unstable weight over during a timeframe that has a duration that is greater than a threshold duration. For example, the threshold duration of time may be 0.5 seconds, 1 second, 2 seconds, etc.

The barcode reader may monitor for the occurrence of one or more of the events described at blocks 504A or 504B.

At block 504A, the barcode reader, which may be generally configured to capture images over a FOV including a product scanning region and decode barcodes depicted in the captured images, may fail, during at least a portion of the timeframe, to transition from a first state (e.g., a "sleep" state or "sleep" mode) in which an imager of the barcode reader does not capture images of the product scanning region, or captures images (e.g., at a first rate) of the product scanning region but does not attempt to decode barcodes from the captured images to a second state (e.g., a "wake" state or "wake" mode) in which the barcode reader captures images (e.g., at a second, faster rate) of the barcode scanning region and attempts to decode barcodes from the captured images and/or transmits the captured images for decoding.

At block 504B, the barcode reader may fail to decode a barcode from any images captured during at least a portion of the timeframe. For example, the barcode reader may capture images during the timeframe that do not include any barcodes, or the barcode reader may capture images during the timeframe that include barcodes that are obscured, blurry, or otherwise difficult for the barcode reader to properly decode.

Optionally, at block 506, the barcode reader may fail to record a transaction event adding an item to a transaction log during a second timeframe, after the first timeframe, in which the weighing scale measures a stable weight that is greater than the most recent measured stable weight prior to the measurement of the unstable weight at block 502. For example, if immediately prior to the measurement of unstable weight during the first timeframe at block 502, the weighing scale measured an stable weight (e.g., 0 lbs., 1 lbs., 2 lbs., etc.) for greater than a threshold duration of time, this would be considered the most recent measured stable weight prior to the measurement of the unstable weight. If during a second timeframe, after the first timeframe, the weighing scale measures a stable weight equal to or less than the most recent stable weight prior to the measurement of the unstable weight (e.g., as shown at FIG. 6A), then an item having a barcode to be decoded was likely dragged over the weighing scale without settling on the weighing scale. In contrast, if during the second timeframe, the weighing scale measures a stable weight greater than the most recent stable weight (e.g., as shown at FIG. 6B) prior to the measurement of the unstable weight (e.g., 0.5 lbs. if the most recent stable weight was 0 lbs.; 2 lb. if the most recent stable weight was 1 lb.; 2.3 lb. if the most recent stable weight was 2 lb., etc.), this may indicate that an item has settled onto the weighing scale. For instance, for a user weighing a bunch of bananas on an initially empty weighing scale, the weighing scale may initially measure a stable weight of 0 lb., then may measure or record an unstable weight as the bananas settle on the weighing scale, then may measure a new stable weight of 1 lb. once the bananas settle on the scale. Accordingly, in the event that a customer was properly purchasing the bananas, there would be a recorded transaction event adding the bananas to a transaction log (e.g., indicating that the bananas were added a customer's list of purchases during the transaction). In contrast, the failure of a recorded transaction event may indicate that the bananas that were settled on the scale were not properly purchased.

At block 508, an alert may be generated based on the measured unstable weight over the period of time and the failure of the barcode reader to "wake up" to decode barcodes or to successfully decode any barcodes during at least a portion of the timeframe. In some examples, the alert may be generated further based on the failure to record a transaction event during the second timeframe as discussed with respect to block 506. The alert may indicate a potential scan avoidance event. In some examples, generating the alert indicating the potential scan avoidance event may include capturing an image of the product scanning region. For instance, the captured image of the product scanning region may be a color image. For example, the image of the product scanning region may be analyzed to identify a product associated with the potential scan avoidance event.

Furthermore, in some examples, generating the alert indicating the potential scan avoidance event may include capturing an image of a user of the barcode reader via a second camera distinct from the barcode reader's camera. For example, the second camera may be positioned and/or angled to capture an image of the face of a user operating the barcode reader. In some examples, a facial recognition algorithm may be used in analyzing the image of the face of the user to identify the user associated with the potential scan avoidance event. In other examples, the image of the face of the user operating the barcode reader may be sent to a computing device associated with a manager, owner, or other stakeholder associated with the retail environment.

In some examples, the method 500 may include presenting an indication of the generated alert indicating the potential scan avoidance event to a user of the barcode reader, e.g., via a user interface of the barcode reader. Moreover, in some examples, the method 500 may include sending an indication of the generated alert indicating the potential scan avoidance event to a remote device for presentation to an individual distinct from a user of the barcode reader (e.g., a manager, owner, or other stakeholder associated with the retail environment).

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method of detecting a scan avoidance event, the method comprising:
   measuring, by a weighing scale associated with a barcode reader, an unstable weight during a first timeframe having a duration that exceeds a duration threshold;
   monitoring for:
      (i) a failure of the barcode reader to transition, during at least a portion of the first timeframe, from a first state in which an imager of the barcode reader does not transmit images for decoding and a second state in which the imager captures images over a field of view (FOV) including a product scanning region and transmits the captured images for decoding; or
      (ii) a failure of the barcode reader to decode a barcode from at least one image captured by the imager of the barcode reader over the FOV including the product scanning region during at least a portion of the first timeframe;
   generating an alert indicating a potential scan avoidance event responsive to both the measured unstable weight during the first timeframe and an occurrence of one of:
      (i) or (ii);

measuring, by the weighing scale, a stable weight during a second timeframe occurring immediately after the first timeframe, the measured stable weight having a scale value greater than a scale value of a most recent stable weight measured by the weighing scale prior to the measurement of the unstable weight during the first timeframe; and monitoring for a failure to record a transaction event adding an item to a transaction log during the second timeframe, wherein generating the alert indicating the potential scan avoidance event is further based on an occurrence of the failure to record the transaction event during the second timeframe.

2. The method of claim 1, wherein generating the alert indicating the potential scan avoidance event further includes capturing an image of the product scanning region by an imager not primarily responsible for generating images used by the barcode reader to decode barcodes.

3. The method of claim 2, wherein the image of the product scanning region captured based on the generated alert is a color image.

4. The method of claim 1, wherein generating the alert indicating the potential scan avoidance event further includes capturing an image of a user of the barcode reader by an imager not primarily responsible for generating images used by the barcode reader to decode barcodes.

5. The method of claim 1, wherein transitioning from the first state to the second state is based on detecting, by a motion detector associated with the barcode reader, a motion in the product scanning region.

6. The method of claim 1, further comprising:
presenting, via a user interface of the barcode reader, an indication of the generated alert indicating the potential scan avoidance event to a user of the barcode reader.

7. The method of claim 1, further comprising:
sending an indication of the generated alert indicating the potential scan avoidance event to a remote device for presentation to an individual distinct from a user of the barcode reader.

8. A system for detecting a scan avoidance event, the system comprising:
a weighing scale;
a barcode reader associated with the weighing scale, the barcode reader configured to capture images over a field of view (FOV) including a product scanning region and configured to decode barcodes depicted in the captured images;
a memory storing computer-readable instructions; and
a processor configured to execute the computer-readable instructions stored on the memory to:
determine that the weighing scale has measured an unstable weight over a first timeframe having a duration that is greater than a threshold duration;
monitor for one of:
(i) a failure of the barcode reader to transition, during at least a portion of the first timeframe, from a first state in which an imager of the barcode reader does not transmit images for decoding and a second state in which the imager captures images over a field of view (FOV) including a product scanning region and transmits the captured images for decoding; or
(ii) a failure of the barcode reader to decode a barcode from at least one image captured by the imager of the barcode reader over the FOV including the product scanning region during at least a portion of the first timeframe;
generate an alert indicating a potential scan avoidance event responsive to both the measured unstable weight during the first timeframe and an occurrence of one of (i) or (ii);
determine that the weighing scale has measured a stable weight during a second timeframe occurring immediately after the first timeframe, the measured stable weight having a scale value greater than a scale value of a most recent stable weight measured by the weighing scale prior to the measurement of the unstable weight during the first timeframe; and
monitor for a failure to record a transaction event adding an item to a transaction log during the second timeframe;
wherein generating the alert indicating the potential scan avoidance event is further based on an occurrence of the failure to record the transaction event during the second timeframe.

9. The system of claim 8, wherein the instructions causing the processor to generate the alert indicating the potential scan avoidance event further include instructions causing the barcode reader to capture an image of the product scanning region.

10. The system of claim 9, wherein the image of the product scanning region captured based on the generated alert is a color image.

11. The system of claim 8, wherein the instructions causing the processor to generate the alert indicating the potential scan avoidance event further include instructions causing the barcode reader to capture an image of a user of the barcode reader by an imager not primarily responsible for generating images used by the barcode reader to decode barcode.

12. The system of claim 8, further comprising a motion detector associated with the barcode reader, and wherein the barcode reader transitioning from the first state to the second state is based on the motion detector detecting a motion in the product scanning region.

13. The system of claim 8, wherein the barcode reader further includes a user interface, and wherein the processor is further configured to execute the computer-readable instructions stored on the memory to present, via the user interface of the barcode reader, an indication of the generated alert indicating the potential scan avoidance event to a user of the barcode reader.

14. The system of claim 8, wherein the processor is further configured to execute the computer-readable instructions stored on the memory to send an indication of the generated alert indicating the potential scan avoidance event to a remote device for presentation to an individual distinct from a user of the barcode reader.

* * * * *